United States Patent
Kirk

(10) Patent No.: US 11,560,885 B2
(45) Date of Patent: Jan. 24, 2023

(54) PORTABLE PUMP WITH HOSE REEL AND TRANSPORT

(71) Applicant: John Sander Kirk, Daysland (CA)

(72) Inventor: John Sander Kirk, Daysland (CA)

(73) Assignee: John Sander Kirk, Daysland (CA)

( * ) Notice: Subject to any disclaimer, the term of this patent is extended or adjusted under 35 U.S.C. 154(b) by 711 days.

(21) Appl. No.: 16/547,104

(22) Filed: Aug. 21, 2019

(65) Prior Publication Data
US 2020/0063730 A1 Feb. 27, 2020

Related U.S. Application Data

(60) Provisional application No. 62/722,854, filed on Aug. 25, 2018.

(51) Int. Cl.
| | |
|---|---|
| *F04B 17/06* | (2006.01) |
| *F04B 41/00* | (2006.01) |
| *B65H 75/34* | (2006.01) |
| *B62D 63/06* | (2006.01) |

(52) U.S. Cl.
CPC ............ *F04B 41/00* (2013.01); *B65H 75/34* (2013.01); *B62D 63/062* (2013.01); *B65H 2701/33* (2013.01)

(58) Field of Classification Search
CPC .......... F04B 41/00; F04B 17/06; F04B 23/00; B65H 75/33; B65H 75/34; B65H 75/425
See application file for complete search history.

(56) References Cited

U.S. PATENT DOCUMENTS

| | | | | |
|---|---|---|---|---|
| 4,050,858 | A * | 9/1977 | Ewbank | E21B 19/22 |
| | | | | 415/168.2 |
| 4,232,826 | A | 11/1980 | Broughton | |
| 5,100,303 | A | 3/1992 | Depault | |
| 5,788,410 | A | 8/1998 | Stucks | |
| 6,309,169 | B1 | 10/2001 | Carlile | |
| 8,579,264 | B1 | 11/2013 | Fowls | |
| 8,985,556 | B2 | 3/2015 | Boulter | |
| 2014/0312156 | A1 * | 10/2014 | Minino | B65H 75/425 |
| | | | | 242/397 |
| 2014/0356198 | A1 | 12/2014 | Rulli | |
| 2015/0158692 | A1 * | 6/2015 | Reynolds | B65H 75/425 |
| | | | | 414/547 |
| 2015/0292282 | A1 * | 10/2015 | Dyck | B65H 75/425 |
| | | | | 166/385 |
| 2017/0001126 | A1 | 1/2017 | Carroll | |
| 2018/0022261 | A1 * | 1/2018 | Weber | B65H 49/325 |
| | | | | 414/462 |

FOREIGN PATENT DOCUMENTS

JP 07027255 A 1/1995

* cited by examiner

*Primary Examiner* — Sang K Kim
(74) *Attorney, Agent, or Firm* — Michael A. Bondi; Moss & Barnett

(57) ABSTRACT

A pump trailer including a frame, a pump and at least one locomotion member. The pump is suspended within the frame using an elevator. The at least one locomotion member is coupled to a base of the frame to facilitate motion of the frame over terrain. The elevator raises the pump to a fully raised position or lowers the pump to a pumping position.

16 Claims, 16 Drawing Sheets

PORTABLE PUMP WITH HOSE REEL AND TRANSPORT

REFERENCE TO RELATED APPLICATION

This application claims priority to Provisional Application No. 62/722,854, filed on Aug. 25, 2018, the contents of which are incorporated herein by reference.

FIELD

This invention is in the field of portable pumps, and more specifically to reconfigurable transports for portable pumps and/or hose reels.

BACKGROUND

Pumps are commonly used to drain small pockets of water (e.g. sloughs) from agricultural land as well as many other uses. Most farmers have one or more of these pumps but seldom use them because these pumps can be awkward to use. For example, the hose may be difficult to roll out, the pump may be heavy and awkward to place within the water pocket, and the hose may be difficult to retrieve.

One such example may be disclosed in U.S. Pat. Pub. No. 2014/0356198 to Flow Control LLC that describes a portable submersible water pump for pumping water from streams, ponds or shallow wells having a predetermined depth. The pumping system features a rotatable reel assembly to receive, roll-up and retain a hose. The submersible pumps are each connected to a manifold in parallel to form a parallel pump configuration. The manifold has a hose connection to couple to the hose. A portable cart has a frame with a first frame part to affix to the reel assembly, a second frame part to affix to a solar panel, a third frame part to detachably receive and retain the submersible pump assembly, and a fourth frame part to affix to the wheel assembly to roll the pump system to a remote location for pumping water in areas with little or no access to grid electricity or liquid fuel.

Another example may be described in Japan Pat. Pub. No. 07027255A to Kubota Corp. that discloses a hose laying method to shorten the setup time to drain a water site. A hose reel with a drain hose wound thereon is placed where the water is to be pumped. After connecting the inlet of the drain hose to a drainage pump mounted on an amphibious vehicle, the vehicle is moved to the water site from the drain site. As the vehicle moves from the water site, the drain hose is towed and laid from the hose reel.

SUMMARY

According to an aspect, there is provided a pump trailer that may comprise: a frame; a pump suspended within the frame using an elevator; at least one locomotion member coupled to a base of the frame to facilitate motion of the frame over terrain; and the elevator raising the pump to a raised position or lowering the pump to a pumping position. The elevator may comprise at least one cable coupled between the pump and the frame. The elevator may further comprise a tray coupled to a pump end of the at least one cable, the tray supporting the pump. The elevator may further comprise a winch operatively coupled to the at least one cable for raising and lowering the pump. The elevator may further comprise a release pin for maintaining a position of the pump. When the release pin is removed, the winch may freely rotate lowering the pump. The winch may comprise a motor. The frame may comprise a support for receiving a lift member. The lift member may be configured to lift the at least one locomotion member from the terrain. The pump trailer may further comprise a fuel storage reservoir having a fuel port. The pump trailer may further comprise a retractable skid located at the hitch that may be pinned in a stationary position.

According to an aspect, there is provided a hose transport that may comprise: a rectangular base member operatively coupled to a U-shaped member at a front end and a triangular pivot member at a front end. The hose transport may further comprise a pair of beams extending rearwards from the triangular pivot member wherein the pair of beams may be coupled to the U-shaped member. The pair of beams may extend from the triangular pivot member in a wedged-shape and may further comprise pads for supporting a hose reel. The hose transport may further comprise a lift device for pivoting the inner pivot member with respect to the outer pivot member thereby exerting a lift force on the pump trailer. According to an aspect, there is provided a hose reel having a standing and a wheeling configuration. The hose reel may have a pair of hoops wherein the pair of hoops may have one or more spokes that may be coupled to a hub. The hose may wrap around the hub. The hub may be off-center from the pair of hoops. A pair of crossbeams may be rotatably coupled on each side of the hub. The crossbeams may be coupled at one end to a pair of elongate members. The elongate members may terminate in a pushing handle. At the end of the crossbeams may be one or more retainers for receiving an elongate support member.

Any and/or all aspects described herein may be used in any and/or all combinations as is understood by one of skill in the art.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Figure 1A:
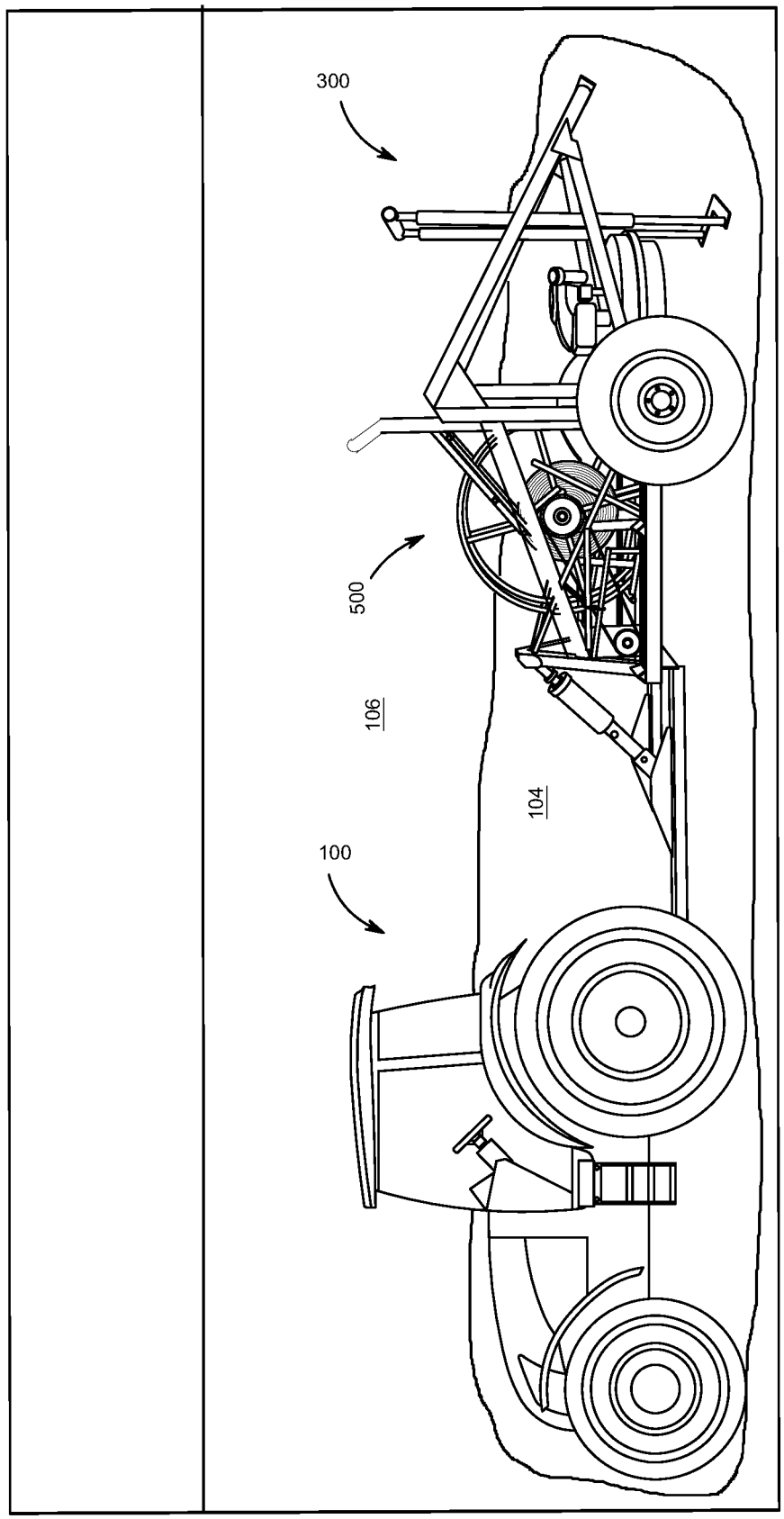
FIGS. 1A and 1B are photographs of the portable pump system being placed (FIG. 1A) and unreeling a hose transport (FIG. 1B) for in use in a slough.
Figure 1B:
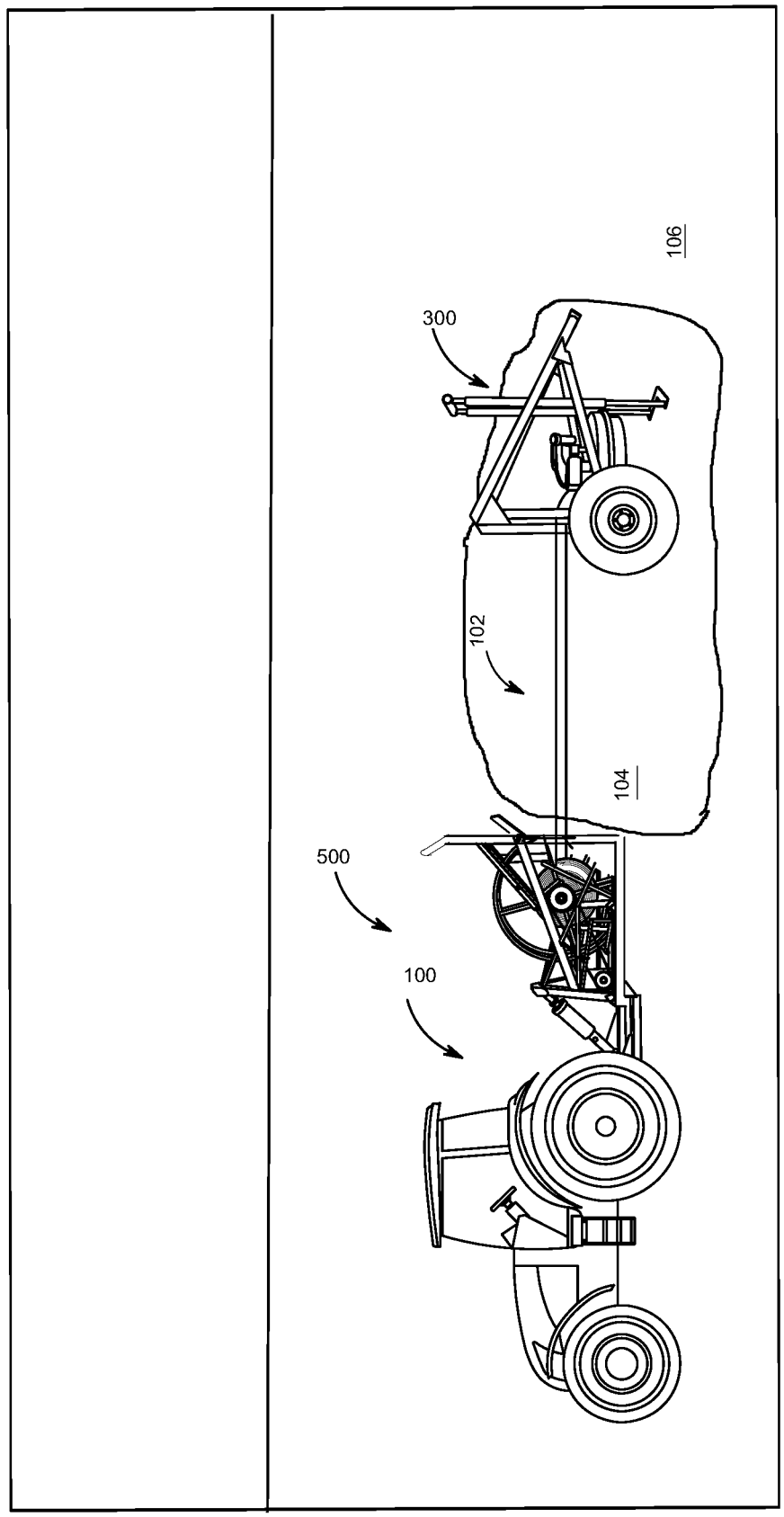

With reference to FIGS. 1A and 1B, a slough 104 (e.g. a low lying area filled or partially filled with water), or other body of water, may be surrounded by generally higher land features 106. The slough 104 may be undesirable as the standing water may prevent or delay planting of crops in that area of the field, provide breeding grounds for mosquitos, and/or attract undesirable wildlife that may feed on the crops. Pumps may be used to pump the water from the slough 104 to other areas of the field in order to water crops in those other areas, to facilitate evaporation, and/or to facilitate absorption of the water into the ground. Slough pumps tend to be heavy and/or awkward to move. The water at the bottom of the slough 104 tends to be muddy causing the pumps to become stuck once the water has been pumped away.

As shown in FIG. 1A, an all-terrain vehicle (ATV) 100 or tractor may be used to place a pump trailer 300 generally in the center of the slough 104 or within the deepest portion of the slough 104. A hose transport 500 may then be decoupled from the pump trailer 300. As shown in FIG. 1B, the ATV 100 may then pull the hose transport 500 away from the pump trailer 300 causing a hose 102, which may be operatively connected to the pump trailer 300, to unreel. The ATV 100 may then drive to a drainage location where the water in the slough 104 may be pumped.

Figure 6:
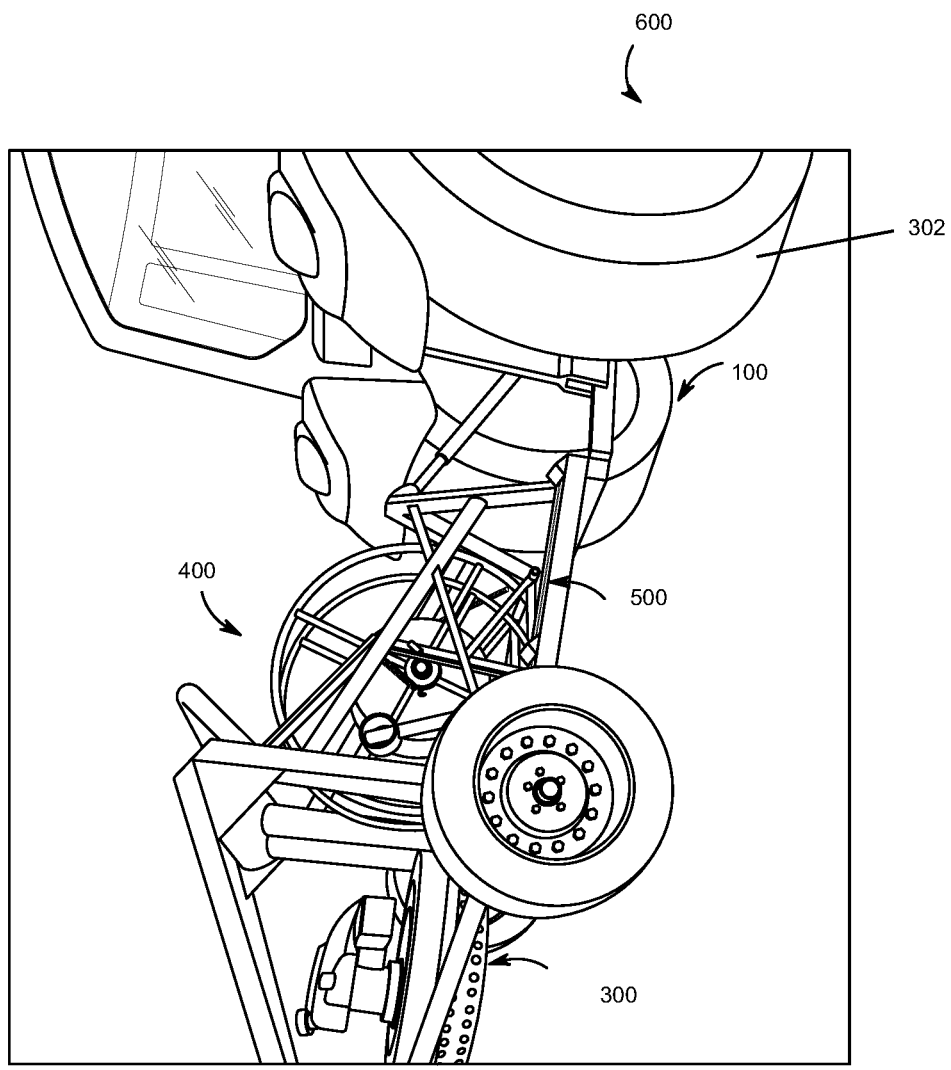
FIG. 6 is a side view of the portable pump system hauled by a tractor in an angled position.

Turning now to FIG. 6, the hose transport 500 may be coupled to the pump trailer 300 and the pump trailer 300 may be in a raised configuration and supported by the hose transport 500 such that a pair of locomotion members 302 on the pump trailer 300 may be clear of the ground. Generally, the mass of the pump trailer 300 and the hose transport 500 may rest on one or more locomotion members 302, such as a pair of wheels or tracks 302, of the pump trailer 300 and may be pulled by a hitch coupled to the ATV 100. In other aspects, the locomotion members 302 may comprise wheels, tracks, skids, skis, and/or any combination thereof. To decouple the pump trailer 300 from the hose transport 500, the hose transport 500 may be lowered by a hydraulic actuator 626 until the wheels 302 of the pump trailer 300 come into contact with the ground. The hose transport 500 may be further lowered until at least a portion of the hose transport 500 becomes clear of the pump trailer 300. The ATV 100 may then pull the hose transport 500 away from the pump trailer 300 as shown in FIG. 1B. In some aspects, the hose transport 500 may then be raised back to the original configuration by the hydraulic actuator 626. Furthermore, the ATV 100 may pull the hose transport 500 away from the pump trailer 300 until a pump release (e.g. a pin holding a freely rotating winch 316) may be triggered causing a pump 324 on the pump trailer 300 to drop into the slough 104. The ATV 100 may then move the hose transport 500 to the drainage location while paying out the hose 102. Further details and aspects of this process may be further described below.

Figure 2A:
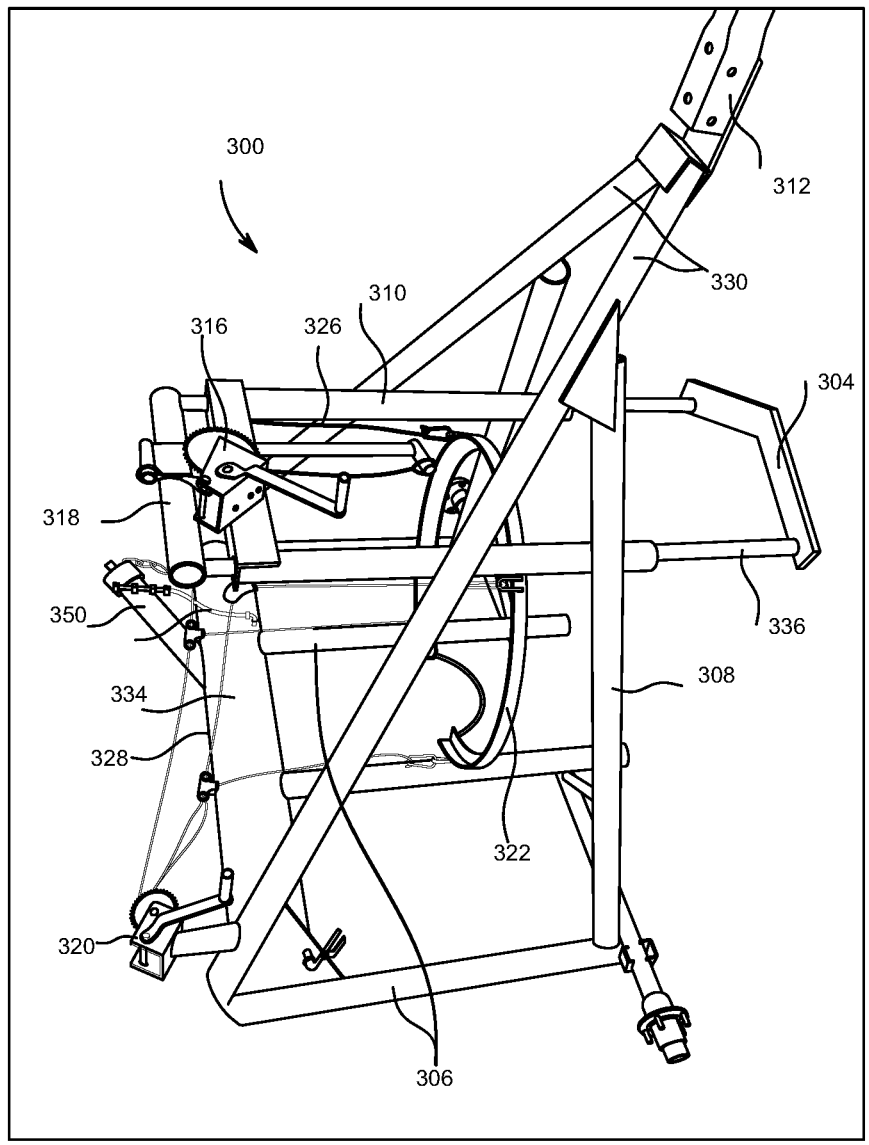
FIG. 2A is a side view photograph of the pump trailer in a partially raised configuration according to an aspect showing a winch in the rear of the trailer to raise the pump.
Figure 2B:
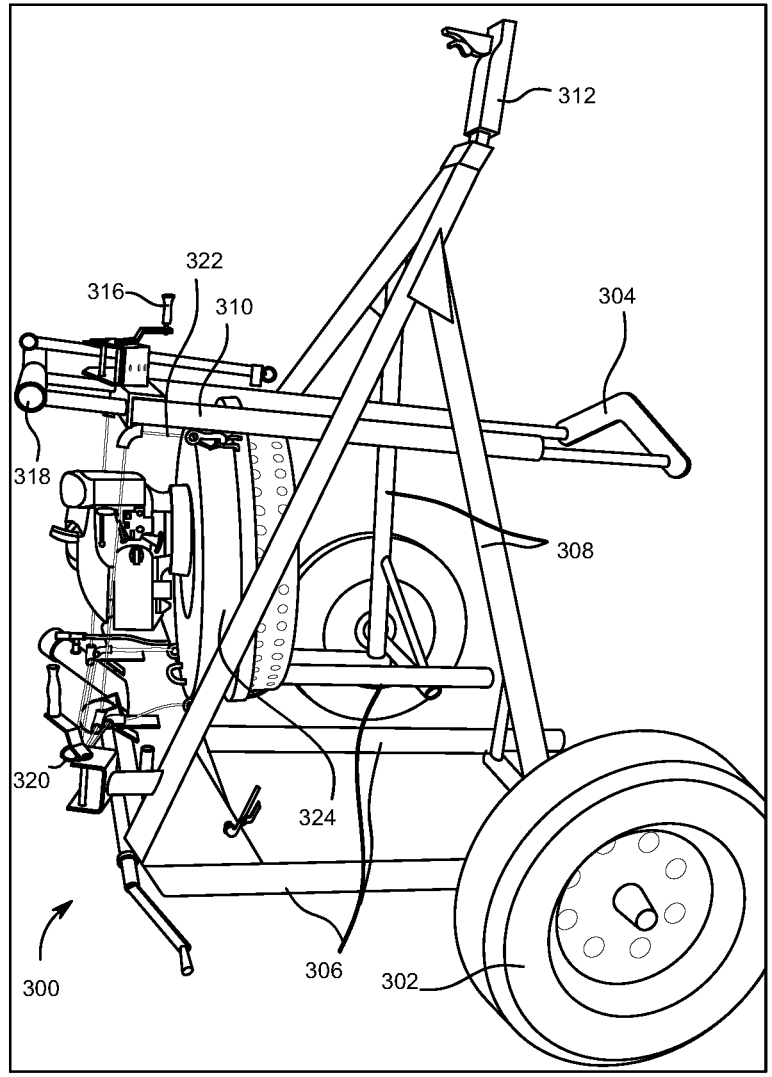
FIG. 2B is a side view photograph of the pump trailer with a pump in a fully raised configuration according to yet another aspect.
Figure 2C:
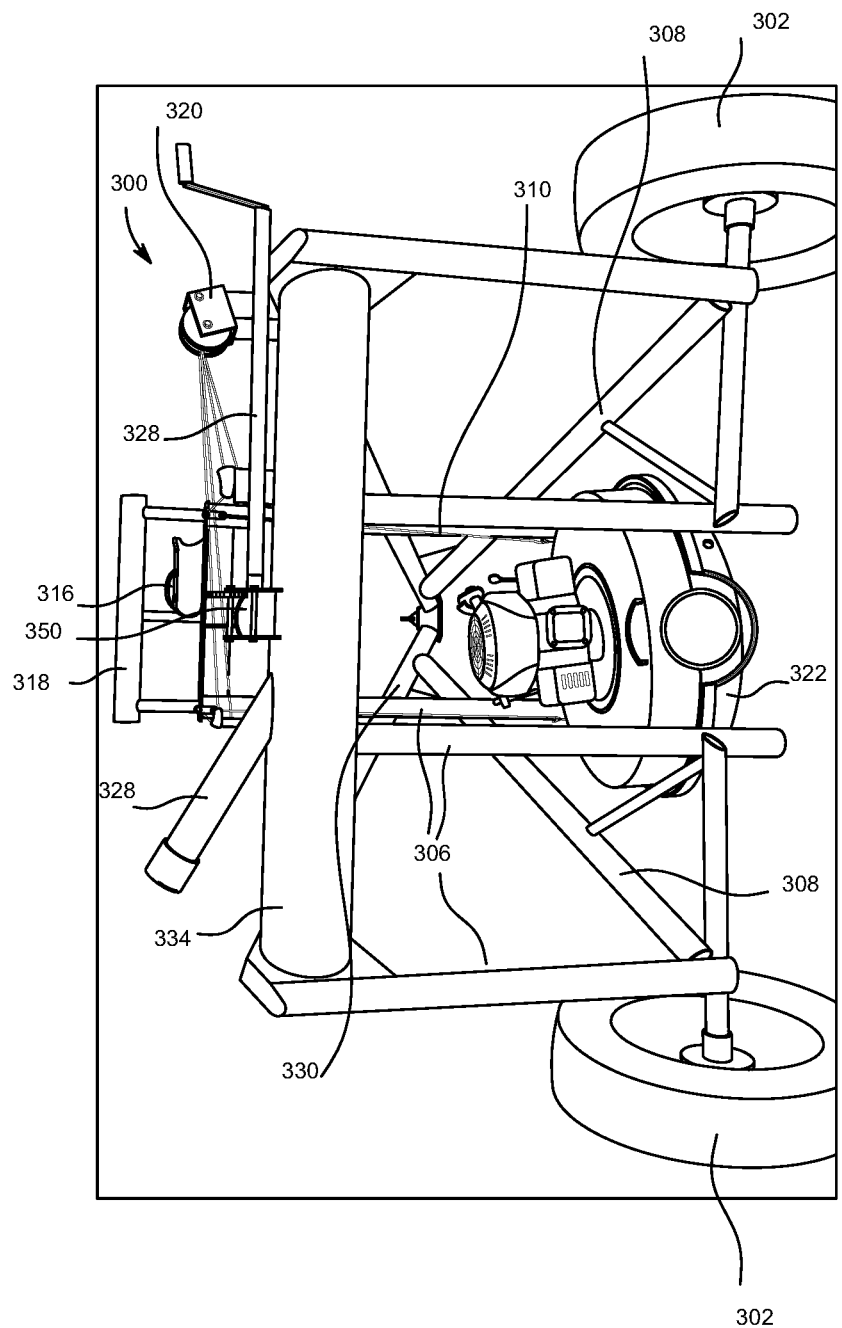
FIG. 2C is a rear view photograph of the pump trailer with the pump in a pumping configuration according to an aspect.

Turning to FIGS. 2A-2C, the pair of locomotion members 302 (e.g. wheels or tracks) of the pump trailer 300 may be coupled to a frame having one or more vertical members 306 extending from the wheels 302. The wheels 302 and the pump 324 have been removed in FIG. 2A to avoid obscuring the other components. In this aspect, there may be a pair of elongate vertical members 306, each coupled at one end to one of an axle connecting the wheels 302. The elongate vertical members 306 may extend upward from each wheel 302. A horizontal crossbeam and gas tank 334 may be coupled to the vertical members 306 near or at an end opposite the wheels 302. The horizontal crossbeam 334 may be generally cylindrical with a diameter of approximately 16.5 centimeters to provide additional strength necessary for supporting the entire pump trailer 300. The horizontal crossbeam 334 may be a support receiving a lift member 616 from the hose transport 500. In this aspect, the horizontal crossbeam 334 may comprise a fuel storage reservoir therein for supplying the pump 324 with fuel such as diesel, gasoline, etc. The fuel storage reservoir may be placed above the pump 324 in order to gravity feed the pump 324 with fuel.

According to some aspects, the fuel storage reservoir may be supplied by way of an angled nozzle 350 or fuel port to facilitate more easy fueling. For example, one or more elongate base supports 308, in this aspect a pair of base elongate members 308, may be coupled near or at the axle of the wheel end of the elongate vertical members 306 and extend generally horizontal with respect to the ground. In another aspect demonstrated in FIG. 2A, the elongate base members 308 may not be horizontal with respect to the ground but rather may extend in an upward direction away from the wheels 302. A pair of elongate upper support members 330 may be coupled proximate to the ends of the horizontal crossbeam 334 and may extend downward towards the base members 308. In this aspect, as the upper support members 330 extend downward toward the base members 308, the upper support members 330 may be directed horizontally inward towards the center axis of the pump trailer 300. The upper support members 330 may then be coupled together at an end opposite the horizontal crossbeam 334 (e.g. the hitch end) forming a triangular truss. A hitch 312 may be coupled where the two upper support members 330 are coupled.

In some aspects, the base members 308 may be coupled near the hitch end of the upper support members 330 forming a pair of triangular side trusses on each side of the pump trailer 300. A pair of upper support members 330 may be coupled at or near one end to the horizontal crossbeam 334 and extend horizontally therefrom towards the hitch 312 of the pump trailer 300. The pair of upper support members 330 may extend horizontally inward towards the center axis of the pump trailer 300.

As shown, a pump 324 may be suspended within the frame of the pump trailer 300 by way of an elevator 326. The pump 324 may be in a fully-raised position (shown in FIG. 2B), and a pumping position (shown in FIG. 2C), or at any point in between. The pump 324 may be suspended using the elevator 326, in this aspect, a plurality of cables coupled to the pump 324. In some aspects, two or more cables 326 may be coupled to the pump 324 in order to horizontally maintain the pump 324 with respect to the ground. In other aspects as shown particularly in FIGS. 2A-2C, the two or more cables 326 may be coupled to a support tray 322 for receiving the pump 324. The cables 326 extend upward to the upper support members 310 and attach to gas tank 334 where the cables 326 may be fed through a cable assembly 328. The cables 326 may then be fed into a winch 320 located at the wheel end (e.g. rear of the pump trailer 300) of the upper support members 330.

Figure 3A:
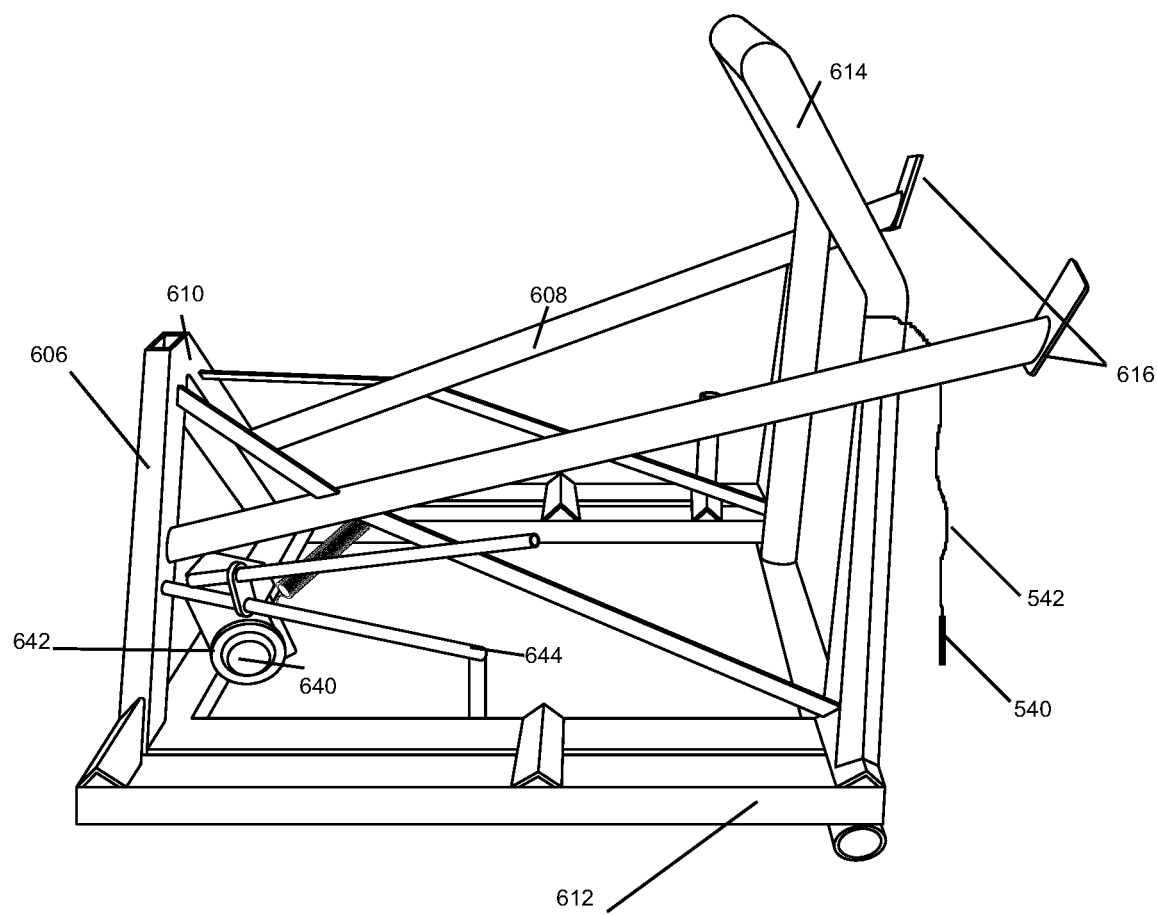
FIG. 3A is a side view photograph of the hose transport system in a stationary position according to the one aspect.

The winch 320 may facilitate raising and lowering the pump 324 while maintaining the pump 324 horizontal with respect to the ground. The winch 320 may comprise a hole (not shown) for receiving a retaining pin 540. The retaining pin 540 may hold the winch 320 in position consequently holding the pump 324 at the specified height. When the retaining pin 540 is removed, the winch 320 freely rotates causing the cables 326 to be fed out. The pump 324 then drops downward into a pumping configuration (e.g. the pump 324 drops towards the water of the slough). As shown in FIG. 3A, the retaining pin 540 may be connected to a release cable 542, which may be secured to the hose transport 500. When the ATV 100 drives away from the pump trailer 300 with the hose transport 500, the release cable 542 becomes tensioned between the pump trailer 300 and the hose transport 500. Eventually, the tension exceeds a friction force to keep the retaining pin 540 within the winch 320 and the retaining pin 540 is removed causing the winch 320 to freely rotate.

A retractable skid 304 may be present at the hitch end of the pump trailer 300. The retractable skid 304 may maintain the pump trailer 300 generally horizontal with respect to the ground when the pump trailer 300 is unhitched. In this aspect, the retractable skid assembly 304 may comprise a pair of vertical outer tubes 310 on each side of the pump trailer 300. The vertical outer tubes 310 may be coupled to the two side trusses in at least two locations to maintain the outer tubes 310 in a vertical orientation with respect to the ground (as seen more clearly in FIG. 2A). A pair of smaller inner support members 336 may freely side within the outer tubes 310 and may be coupled at an upper end to each other using a crossbeam 318 and may be coupled at a bottom end to the retractable skid 304. A second winch 316 located on the hitch end of the pump trailer 300 may maintain the retractable skid 304 in position. One or more cables coupled to the crossbeam 318 wrapped around the winch 316 may cause the retractable skid 304 to be raised or lowered. The retractable skid 304 may form a wedge-shape pointed towards the hitch 312 to facilitate dragging of the trailer with the retractable skid 304 in a down position.

With reference to FIGS. 3A to 3D, the hose transport 500 may comprise a generally rectangular base 612 for supporting a U-shaped member 614 at a rear end and a triangular pivot member 606 at a front end. The hose transport 500 may comprise a pair of wedged beams 608 extending rearwards from the triangular pivot member 606 and may be coupled to the U-shaped member 614. The wedged beams 608 may comprise pads 616 for supporting the pump trailer 300 when placed on the hose transport 500. The actuating hitch 800, described in further detail below, may be coupled to an apex 610 of the triangular pivot member 607.

A motor support 644 may be coupled to the rectangular base 612 on one side and proximate to the front end. The motor support 644 may support a motor 642 rotating a shaft for winding the hose 102 onto the hose reel 400. In this aspect, a belt 620 shown in FIG. 3B may be coupled between the rotating shaft 640 of the motor 642 and a hub 408 of the hose reel 400. A handle 538 may be used to loosen the belt 620 so that the belt 620 may be removed from the hub 408. The handle 538 may be used to tension the belt 620 to allow the rotating shaft 640 to rotate the hub 408 thereby winding the hose 102 onto the hose reel 400.

Figure 3B:
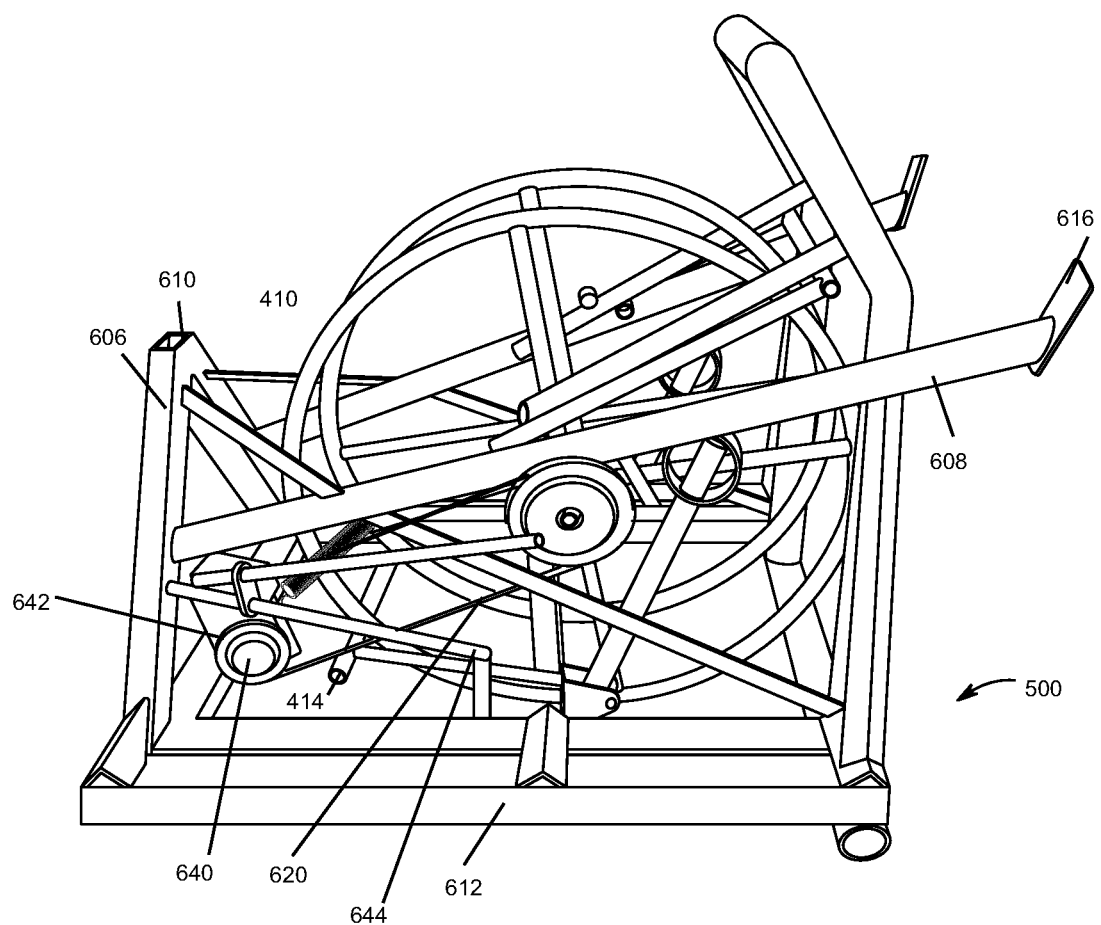
FIG. 3B is a side view photograph of the hose transport system supporting the hose reel in a stationary position according to the one aspect.
Figure 3C:
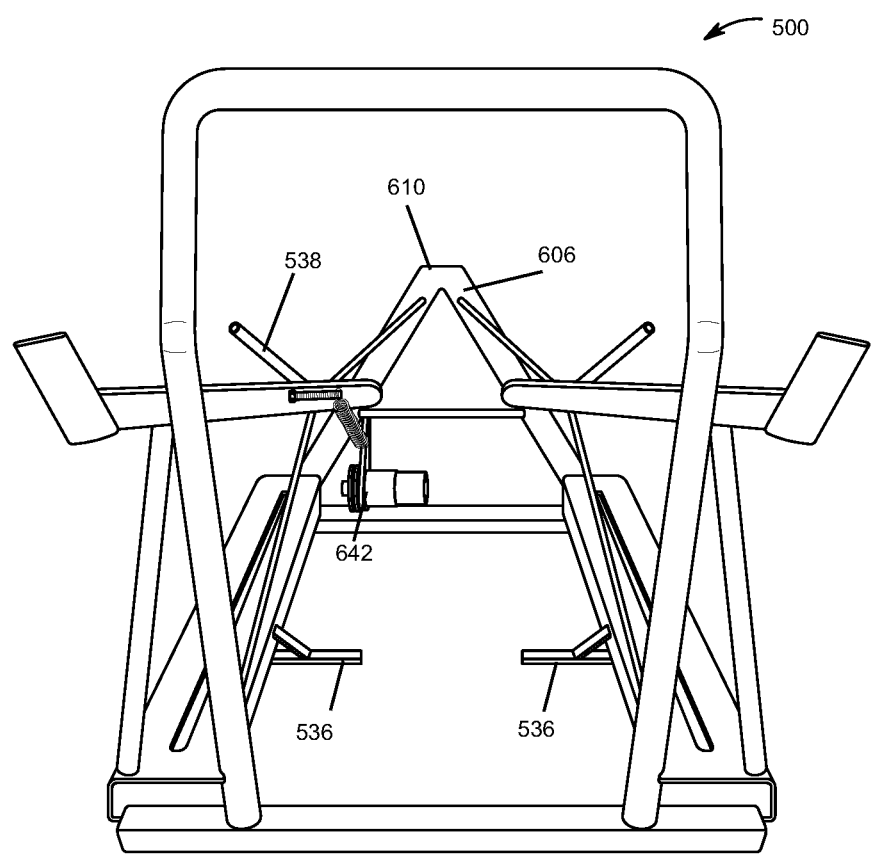
FIG. 3C is a perspective view photograph of the hose transport system in a stationary position according to the one aspect.
Figure 3D:
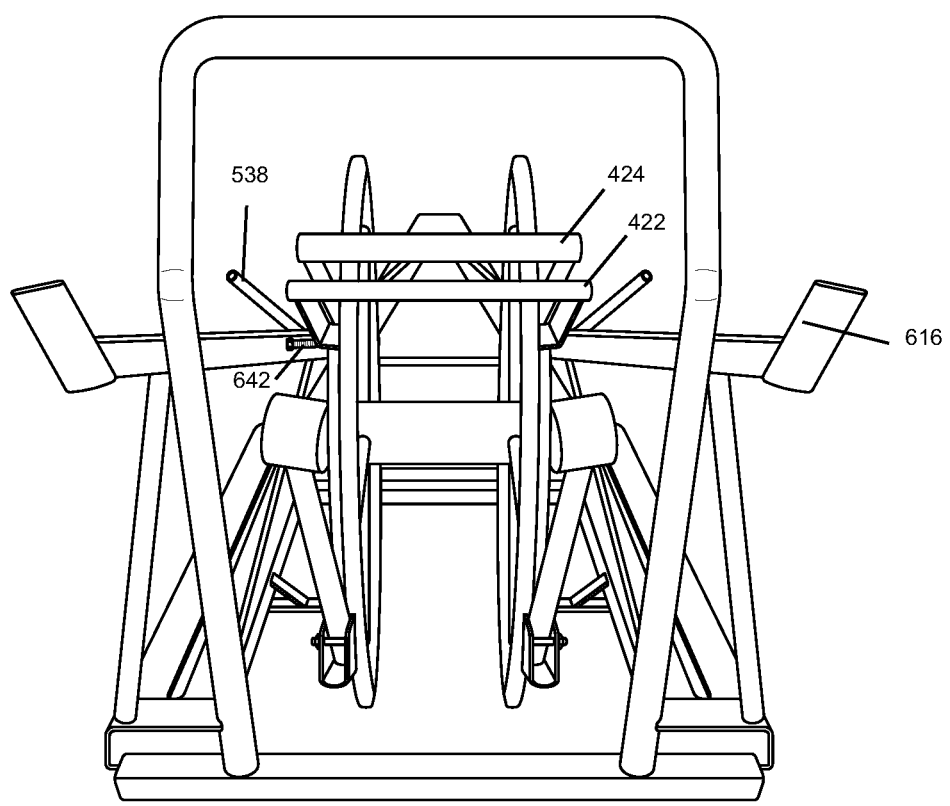
FIG. 3D is a perspective view photograph of the hose transport system supporting the hose reel in a stationary position according to the one aspect.

As shown in FIG. 3B, the hose transport 500 may receive the hose reel 400 from the rear of the hose transport 500. The hose reel 400 may be sized to appropriately fit through the U-shaped member 614 and be held horizontally in place by the pair of wedged beams 608. A pair of lower protrusions 536 (shown more clearly in FIG. 3C) may hold the hose reel 400 in position vertically.

With reference to FIGS. 3B and 3D to 3F, the hose reel 400 may comprise a pair of hoops 402. The pair of hoops 402 may comprise one or more spokes 404 coupled to the hub 408 generally forming a wheel with the hoops 402. The hose 102 may wrap around the hub 408 forming a coil 406. In some aspects, the end of the hose 102 may be coupled to the coil 406. In some aspects, the hub 408 may be off-center from the pair of hoops 402. A pair of crossbeams 416 may be rotatably coupled on each side to the hub 408. The crossbeams 416 may be coupled at or near one end to a pair of elongate members 418. The elongate members 418 may terminate in a pushing handle 424 that extends between the elongate members 418. In some aspects, the hose reel 400 may temporarily rest while the hose reel 400 may be rolled around on the pair of hoops 402.

The hose reel 400 may further comprise a latching handle 422 coupled near or at an end of a pair of latching elongate members 428 on each side of the hoops 402. The latching elongate members 428 may be rotatably coupled to the elongate members 418 at a pivot point 440 between the latching handle 422 and a latching hook 426. The latching hook 426 may be located at or near an end opposite to the latching handle 422. A spring 410 may be coupled to the latching elongate members 428 in order to maintain the latching handle 422 near the pushing handle 424. In this aspect, the latching handle 422 may be closer to the hoops 402 than the pushing handle 424.

Figure 3E:
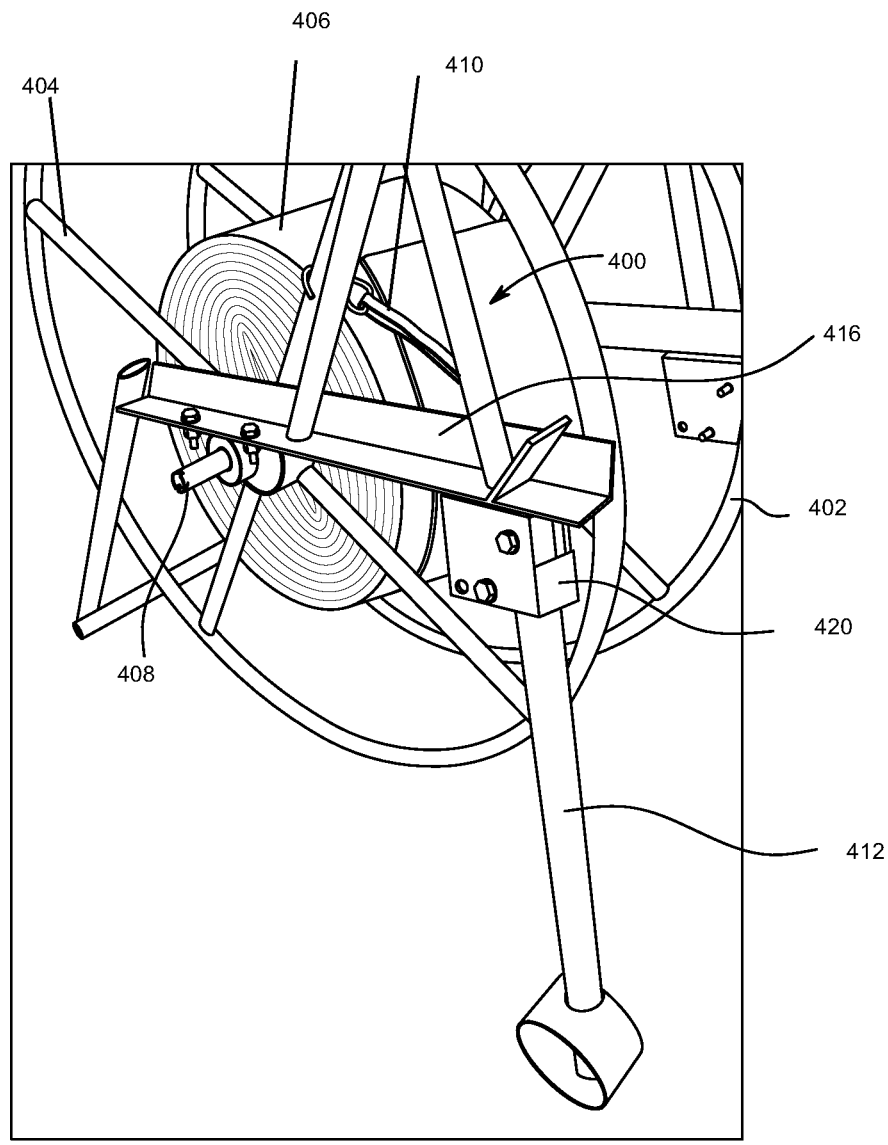
FIG. 3E is a rear perspective view photograph of the hose reel in a stationary position according to the another aspect.
Figure 4A:
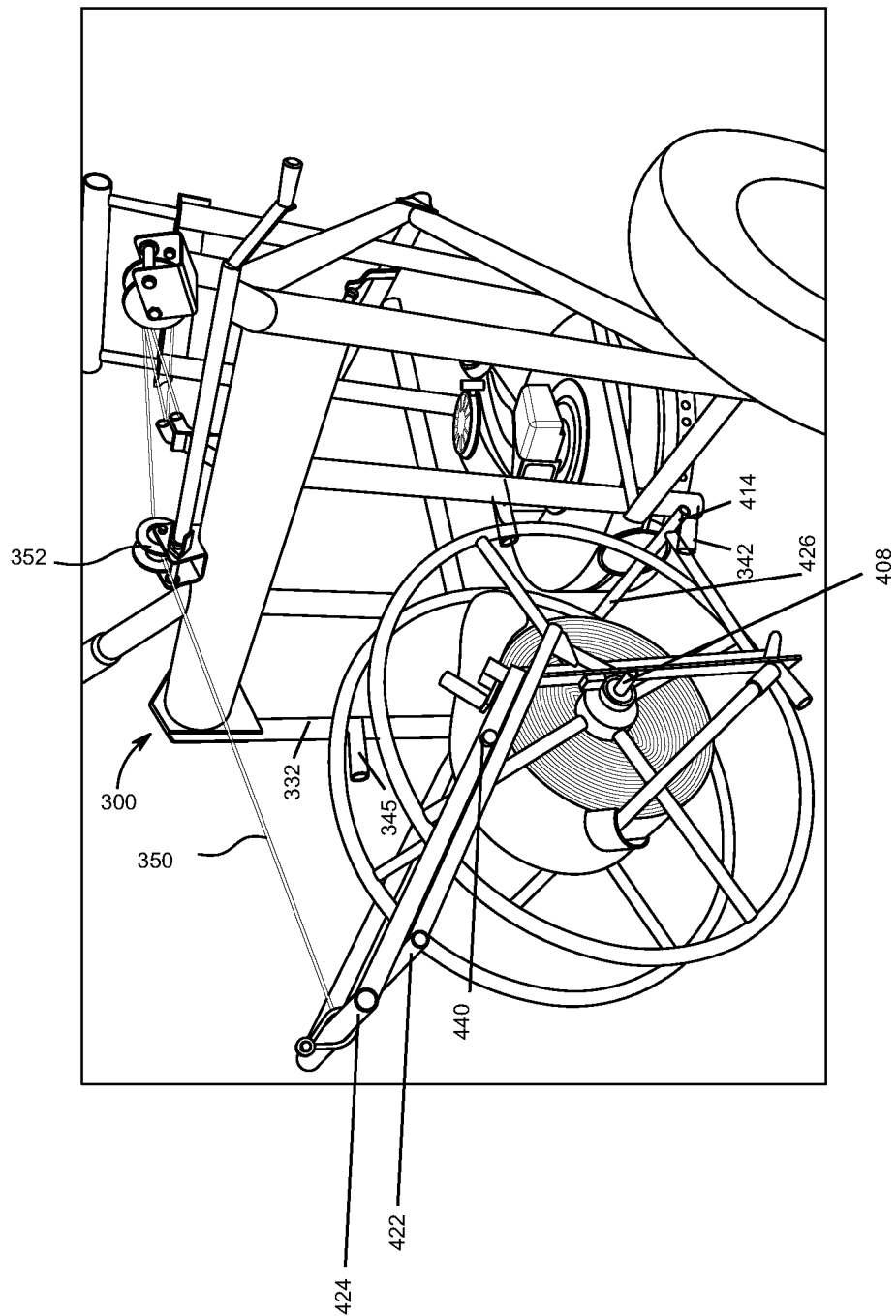
FIGS. 4A and 4B are rear perspective photographs of the pump trailer with the hose reel having an alternative coupling configuration.

The hose reel 400 may comprise a standing configuration shown in FIG. 3E, a trailer configuration shown in FIG. 3B, and/or a wheeling configuration shown in FIG. 4A. In the standing configuration, the hose reel 400 may be generally stationary and may permit the hose 102 to be reeled onto the hose reel 400. In the trailer configuration, the hose reel 400 may be transported via the hose transport 500 or the pump trailer 300. In wheeling configuration, the hose reel 400 may be rolled around to facilitate loading and unloading of the hose reel 400 from the trailers 300 and 500.

Figure 3F:
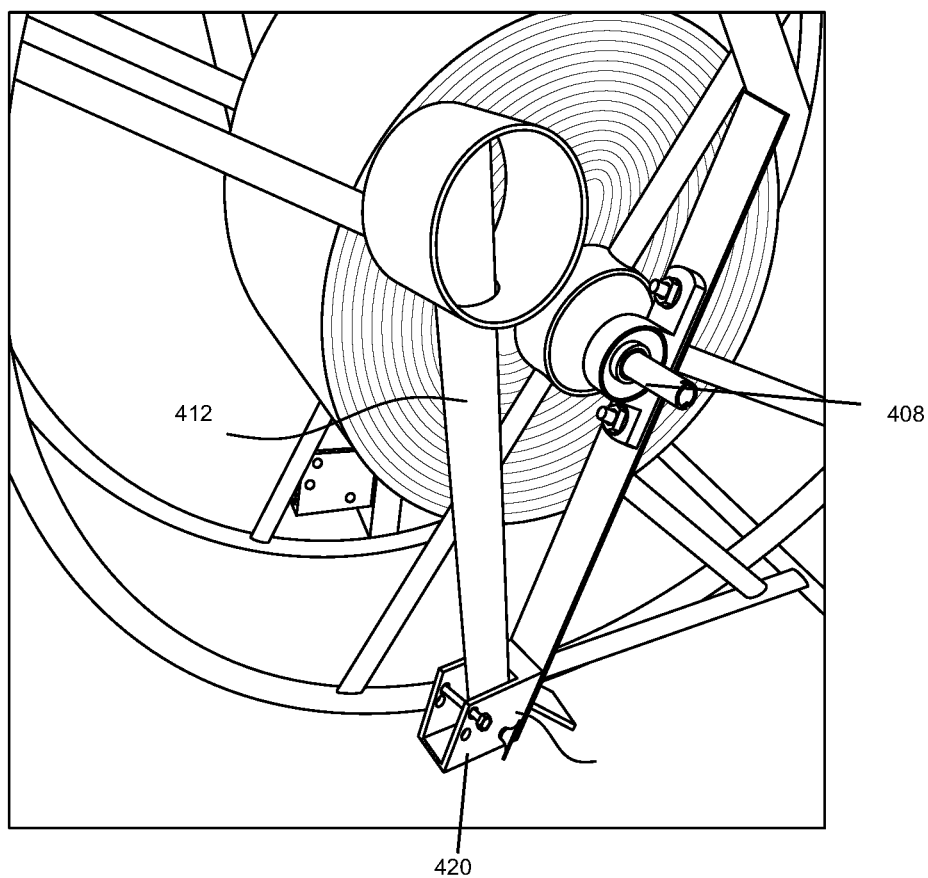
FIG. 3F is a rear perspective view photograph of the hose reel in the mobile configuration according to another aspect.

At or near the other end of the crossbeam 416, there may be one or more retainers 420 for receiving an elongate support member 412. As demonstrated in FIG. 3E, the elongate support member 412 may be configured as a stand holding the hub 408 high enough above the ground such that the hoops 402 may rotate freely. As shown in FIGS. 3E and 3F, the retainers 420 may comprise a number of holes (e.g. three) corresponding to a number of bolts. In this aspect, two of the holes are located diagonally from each other on two corners of the retainer 420 and one hole is located approximately along the center of one edge of the retainer 420. When in the moveable position (such as FIG. 3F), the bolts are placed through the two corner holes. When in the stationary position (such as FIG. 3E), the bolt is placed in one corner hole and the hole located along the center of one edge of the retainer 420. One of the corner bolts may pass through the elongate support member 412 to hold the elongate support member 412 within the retainer 420. In another aspect, the elongate support member 412 may be configured such that the elongate support member 412 may not touch the ground and may not fall out while the hose reel 400 is being rolled around on the pair of hoops 402.

Figure 4B:
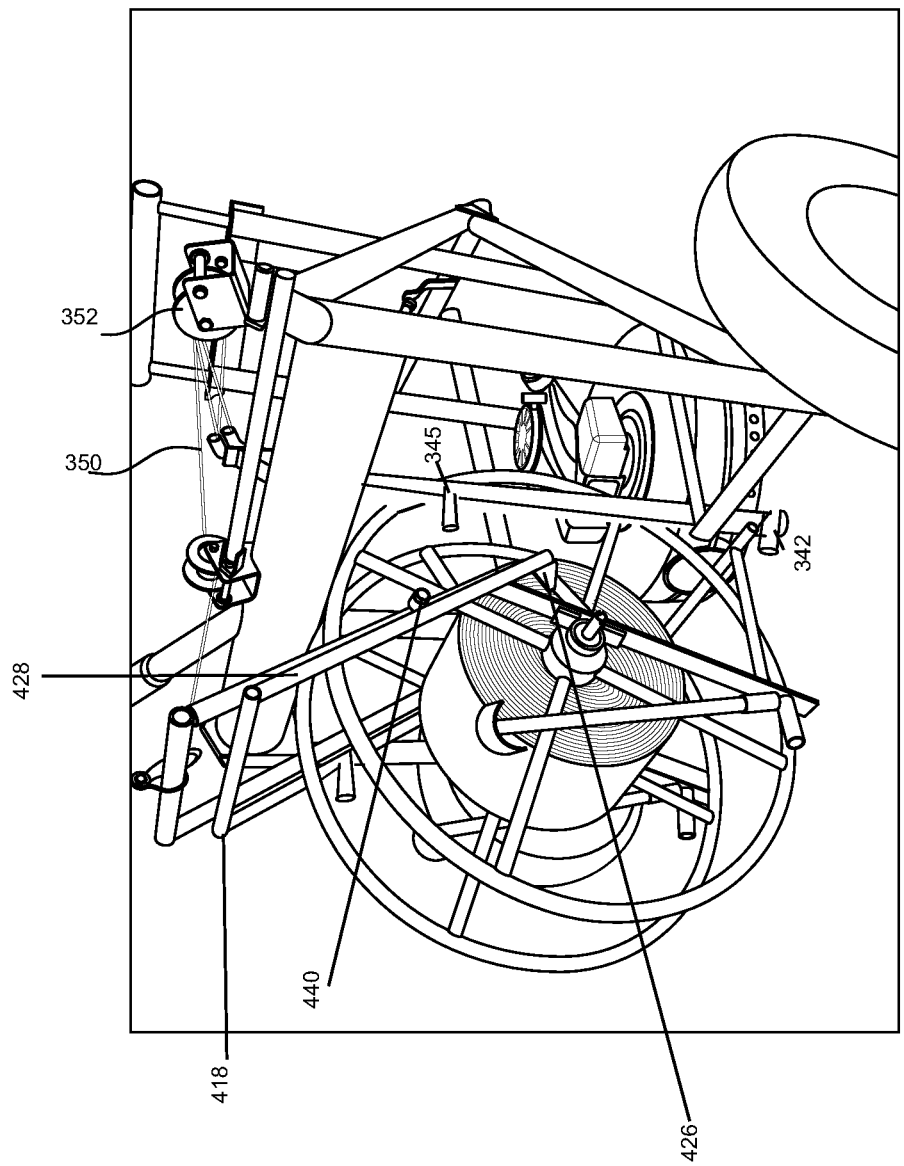

In another aspect shown more clearly in FIGS. 4A and 4B, the pump trailer 300 may be configured to receive the hose reel 400. In this aspect, the beam 414 may be placed over a pair of lower support protrusions 342 In one example, the pump trailer 300 may comprise a winch 352 having a lift cable 350 wound thereon. The lift cable 350 may be coupled to the latching handle 422 such that when the winch 352 is wound in, the lift cable 350 lifts the hose reel 400. When the winch 352 unwinds, the lift cable 250 lowers the hose reel 400.

Figure 5A:
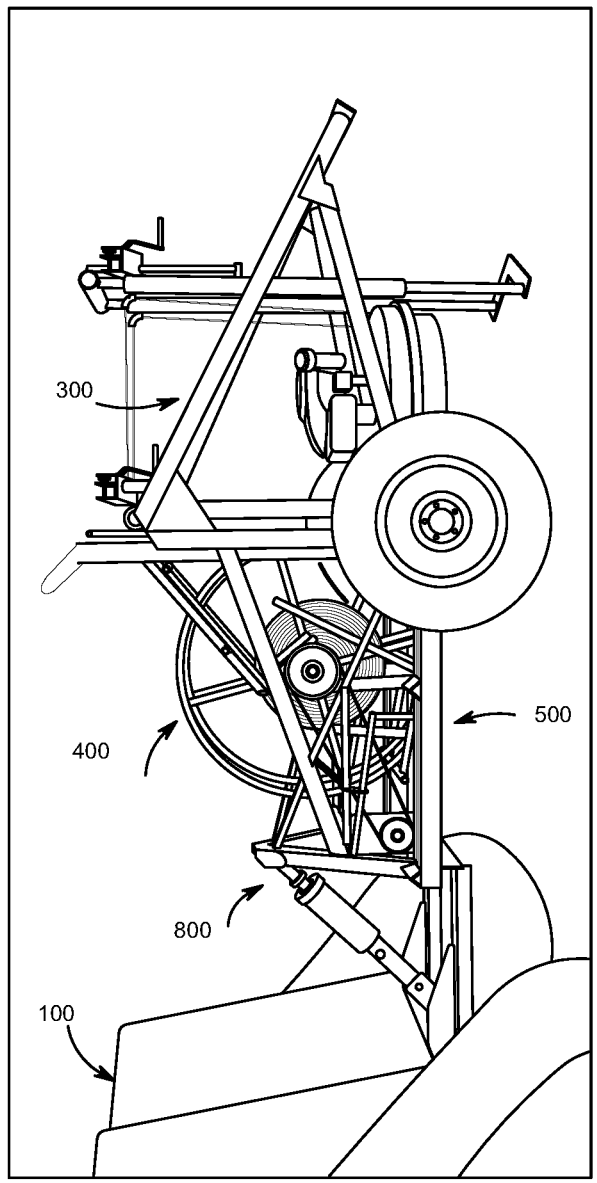
FIG. 5A is a side view photograph of the hose transport and the pump trailer in a raised position using an actuating hitch.
Figure 5B:
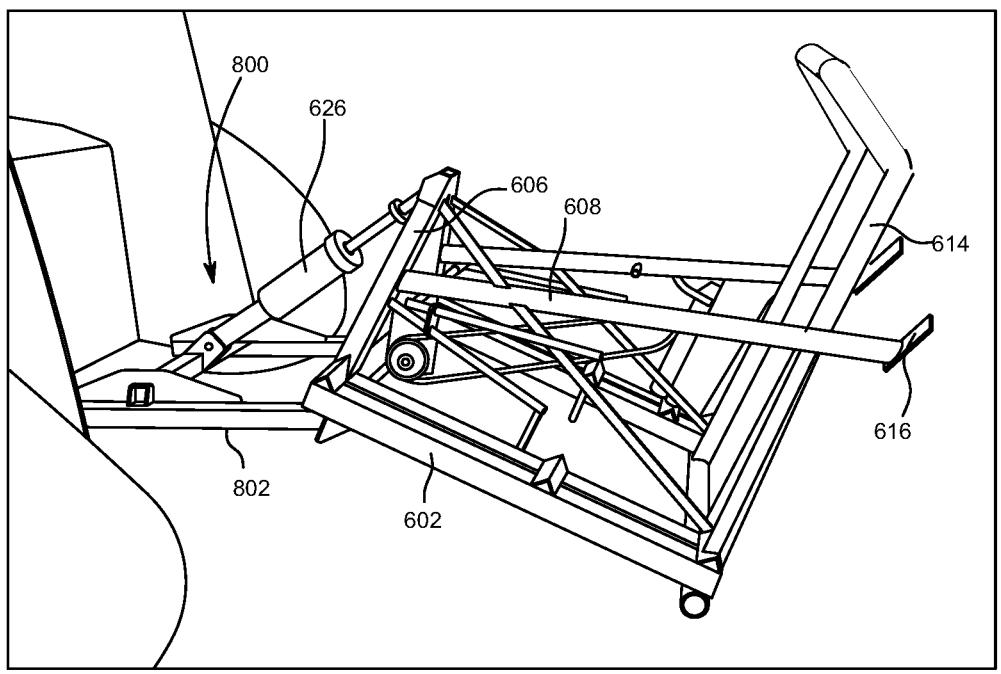
FIG. 5B is a side view photograph of the actuating hitch in a lowered position.

Furthermore, an actuating hitch 800 that may comprise a frame 802 coupled to the ATV 100. The actuating hitch 800 comprises a hydraulic actuator 626 coupled to the hose transport 500 by a support frame 607. The hydraulic actuator 626 and the frame 802 may comprise enough strength to lift the hose transport 500, hose reel 400, and/or the pump transport 300 as shown in FIG. 5A. When the hydraulic actuator 626 extends, the hose transport 500 may be lowered as shown in FIG. 5B.

The hose transport 500 may be coupled to the ATV 100 using the actuating hitch 800, that in this aspect may be the same configuration as the hitch 312 of the pump trailer 300. The triangular pivot member 606 of the hose transport 500 may be coupled to the ATV 100 via an actuating hitch 800 using a hydraulic cylinder 626 (FIG. 5B). The actuating hitch 800 comprises a hydraulic actuator 626 coupled to the hose transport 500 by way of triangular pivot member 607. When the hydraulic actuator 626 extends, the hose transport 500 may be lowered as shown in FIG. 5B.

FIG. 6 illustrates the portable pump system 600 hauled at a rear of ATV 100 in a lifted and an inclined position. The pump trailer 300 includes the pump 324 suspended within. The pump trailer 300 is attached to the hose transport 500, and the hose transport 500 includes the hose reel 400 within. This configuration enables the ATV 100 to transport the entire portable pump system for placement.

Although the aspects described herein may recite that the members or supports are coupled, this language is used for convenience. The members or supports may be welded, integrally formed, coupled using a pin, friction fitted, screwed, bolted, buckled, strapped, and/or any other fastener known in the art in order to hold the members or supports together.

Although the aspects described herein may describe a single hydraulic actuator 30, other aspects may comprise an additional hydraulic actuator.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A pump trailer comprising:
a frame;
a pump suspended within the frame using an elevator;
at least one locomotion member coupled to a base of the frame to facilitate motion of the frame over terrain;
the elevator raising the pump to a fully raised position or lowering the pump to a pumping position; and
a retractable skid located at a hitch and operatively coupled to the frame to be raised or lowered.

2. The pump trailer according to claim 1, wherein the elevator comprises at least one cable coupled between the pump and the frame.

3. The pump trailer according to claim 2, wherein the elevator further comprises a tray coupled to a pump end of the at least one cable, the tray supporting the pump.

4. The pump trailer according to claim 2, wherein the elevator further comprises a winch operatively coupled to the at least one cable for raising and lowering the pump.

5. The pump trailer according to claim 4, wherein the winch further comprises a hole for receiving a retaining pin for maintaining a position of the pump.

6. The pump trailer according to claim 5, wherein when the retaining pin is removed from the hole, the winch freely rotates lowering the pump.

7. The pump trailer according to claim 4, wherein the winch comprises a motor.

8. The pump trailer according to claim 1, wherein the frame comprises a support for receiving a lift member.

9. The pump trailer according to claim 8, wherein the lift member is configured to lift the at least one locomotion member from the terrain.

10. The pump trailer according to claim 1, further comprising a fuel storage reservoir having a fuel port.

11. A pump trailer comprising:
a frame;
a pump suspended within the frame using an elevator;
at least one locomotion member coupled to a base of the frame to facilitate motion of the frame over terrain;
the elevator raising the pump to a fully raised position or lowering the pump to a pumping position; and
a hose transport comprising:
a rectangular base member operatively coupled to a U-shaped member at a rear end and a triangular pivot member at a front end; and
a removable hose reel.

12. The pump trailer according to claim 11, wherein the hose transport further comprises a pair of beams extending rearwards from the triangular pivot member.

13. The pump trailer according to claim 12, wherein the pair of beams extend from the triangular pivot member in a wedged-shape.

14. The pump trailer according to claim 11, wherein the hose transport further comprises a pair of beams coupled to the U-shaped member.

15. The pump trailer according to claim 11, wherein the hose transport further comprises a pair of beams including pads at one end for supporting the removable hose reel.

16. The pump trailer according to claim 11, wherein the hose transport further comprises a lift member for lifting a pump trailer.

* * * * *